US006376595B1

(12) United States Patent
Palmlöf

(10) Patent No.: US 6,376,595 B1
(45) Date of Patent: Apr. 23, 2002

(54) MASTER BATCH

(75) Inventor: Magnus Palmlöf, Västra Frölunda (SE)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 09/696,138

(22) Filed: Oct. 25, 2000

Related U.S. Application Data

(63) Continuation of application No. PCT/SE99/00475, filed on Mar. 25, 1999.

(30) Foreign Application Priority Data

May 7, 1998 (SE) .............................................. 9801593

(51) Int. Cl.$^7$ ................................................. C08K 3/04
(52) U.S. Cl. ...................................................... 524/495
(58) Field of Search ......................................... 524/495

(56) References Cited

U.S. PATENT DOCUMENTS

| 4,374,227 A | | 2/1983 | Michie, Jr. | |
| 5,306,775 A | * | 4/1994 | Martin et al. | 525/240 |

FOREIGN PATENT DOCUMENTS

| EP | 0 533 155 A1 | 3/1993 |
| EP | 0 739 937 A2 | 10/1996 |

OTHER PUBLICATIONS

File WPI, Derwent accession No. 89–119522, Showa Denko KK: "Polyethylene pipe for water supply—comprises blend of carbon black master batch and linear low density polyethylene, for good weather resistance"; JP,A,1066252, 890313.

File WPI, Derwent access No. 82–55667E, Dainichiseika Color & Chem MFG: "Colour foamed, polyethylene–insulated wire–in which coating has smooth surface and uniform cell size": JP,A,57084517, 820526.

"Ziegler–Natta Catalysts", *Encyclopedia of Polymer Science & Engineering,* 2nd ed., vol. 17 (1989): pp. 1027–1028.

McDaniel. "Supported Chromium Catalysts for Ethylene Polymerization", *Advances in Catalysis,* vol. 33 (1985): pp. 47–98.

McDaniel. "Controlling Polymer Properties with the Phillips Chromium Catalysts" *Ind. Eng. Chem. Res.,* vol. 27 (1988): pp. 1559–1564.

Marsden. "The Influence of Silica Support on Polymerisation Catalyst Performance", *Preparation of Catalysts,* edited by Oncelet et al. (1991): pp. 215–227.

* cited by examiner

*Primary Examiner*—Kriellion A. Sanders
(74) *Attorney, Agent, or Firm*—Merchant & Gould P.C.

(57) ABSTRACT

A master batch for the production of cross-linked polymer pipes is described. The master batch comprises carbon black and a polymer carrier consisting of a Ziegler-Natta catalyzed polyethylene with a density of at least 0.940 g/cm$^3$. A cross-linkable polymer composition comprising the master batch and a chromium catalyzed polyethylene base polymer, and a cross-linked polyethylene pipe made by cross-linking the cross-linkable polymer composition are also described.

10 Claims, No Drawings

MASTER BATCH

This application is a continuation of international application No. PCT/ SE99/00475, filed Mar. 25, 1999.

FIELD OF INVENTION

The present invention relates to a master batch for the production of crosslinked polymer pipes, a crosslinkable polymer composition for the production of crosslinked polymer pipes, and a crosslinked polymer pipe.

TECHNICAL BACKGROUND

It is well known to make pipes of polymer materials such as polyethylene plastic or polypropylene plastic. It is also known to enhance the properties of polymer pipes by utilizing crosslinked polymer material such as e.g. crosslinked polyethylene plastic. Several properties such as e.g. the crack resistance are improved by using a crosslinked polymer material. Crosslinked polymer pipes are used inter alia for the distribution of water such as drinking water; for the distribution of gas, e.g. in connection with off-shore applications; in district heating systems; etc. The design stress of a crosslinked polymer pipe which is the circumferential stress the pipe is designed to withstand for 50 years without failure is determined for different temperatures in terms of the Minimum Required Strength (MRS) according to ISO/TR 9080. Thus, today crosslinked polyethylene pipes achieve an MRS 80 or 8.0 MPa at 20° C.

It would be a substantial technical progress if the design stress of crosslinked polymer pipes, more particularly crosslinked polyethylene pipes could be improved. Practically this would mean that for a given stress the pipe could be made thinner, i.e. less material could be used for making the pipe, or alternatively for a given thickness of the pipe it could withstand higher stress. As an example, pipes for transporting gas in the off-shore industry may be made of crosslinked polyethylene clad on the outside with steel. If the design stress of the crosslinked polyethylene used for such pipes could be increased, the outer steel cladding could be made thinner and as a result the pipe would be less expensive.

THE INVENTION

According to the present invention it has now been discovered that a substantial improvement in design stress can be achieved for crosslinked black polymer pipes, i.e. pipes having carbon black as the pigment, if the master batch for introducing the pigment into the base polymer is a Ziegler-Natta catalyzed high density polyethylene with a density of at least 0.940 g/cm$^3$.

The present invention thus provides a master batch for the production of crosslinked polymer pipes which master batch comprises carbon black and a polymer carrier, characterised in that the polymer carrier is a Ziegler-Natta catalysed polyethylene with a density of at least 0.940 g/cm$^3$.

Further, the present invention provides a crosslinkable polymer composition for the production of crosslinked polymer pipes which comprises a polyethylene base polymer compounded with a master batch which comprises carbon black and a polymer carrier, characterised in that the polyethylene base polymer is a chromium catalysed high density polyethylene, and that the polymer carrier of the master batch is a Ziegler-Natta catalysed polyethylene with a density of at least 0.940 g/cm$^3$.

Still further, the present invention provides a crosslinked polyethylene pipe, characterised in that it has been made by crosslinking a pipe of the crosslinkable polymer composition defined above with a peroxide crosslinking agent.

These and other advantages and characterising features of the present invention will appear from the following specification and the appended claims.

DETAILED DESCRIPTION OF THE INVENTION

By the expression "polyethylene" is meant, generally and in connection with the present invention, a homopolymer of ethylene or a copolymer of ethylene, wherein the ethylene monomer constitutes the major part of the mass. Thus, the polyethylene may include from 0 to about 25% by weight, preferably about 1–15% by weight of one or more comonomers which are copolymerisable with ethylene. Such comonomers are well known to those skilled in the art and no extensive enumeration will be required, but as examples, mention may can made of vinylically unsaturated monomers, such as $C_3$–$C_8$ alpha olefins, for instance propene and butene.

The polymer pipe of the present invention is made of a crosslinkable polymer composition which comprises a polyethylene base polymer and a master batch including carbon black in a specific polymer carrier.

Master batches are used for incorporating additives such as pigments into polymer compositions. The pigment should be dispersed homogenously in the master batch in order to achieve a homogenous dispersion of the pigment in the base polymer when compounding the base polymer with the master batch. Since pigments are more easily dispersed in low density polyethylene, i.e. polyethylene produced by radical initiated high pressure polymerisation, low density polyethylene is normally used as the polymer carrier of the master batch.

In the present invention it has been discovered, however, that a polymer having surprisingly superior characteristics with regard to the design stress value may be obtained by using a pigment master batch which in addition to carbon black as pigment has a Ziegler-Natta catalysed high density polyethylene as the polymer carrier of the master batch instead of low density polyethylene. The density of this Ziegler-Natta catalysed hig density polyethylene is at least 0.940 g/cm$^3$, preferably 0.940–0.970 g/cm$^3$, and more preferably 0.955–0.965 g/cm$^3$.

Ziegler-Natta catalysed high density polyethylene, i.e. polyethylene produced by the use of a coordination catalyst of the Ziegler-Natta type as disclosed in Encyclopedia of Polymer Science and Engineering, 2nd Ed., Vol. 17 (1989), p. 1027–1028, is well known. Apart from the polymer carrier being a Ziegler-Natta catalysed polyethylene having a density as defined above, there are no other particularly critical features regarding the polymer carrier of the master batch of the present invention.

Besides the polymer carrier the master batch of the present invention comprises carbon black as pigment for the polymer composition. The type of carbon black is not particularly critical at the present invention and different types of carbon black such as furnace black, channel black, etc. may be used. The amount of carbon black included in the master batch depends on the amount of carbon black which it is desired to incorporate into the polymer composition and also on the amount of carbon black possible to include in the master batch. Generally, the amount of carbon black in the master batch lies in the range 30 to 60% by weight, preferably 40 to 50% by weight of the master batch in order to obtain 1 to 5% by weight, preferably 2 to 2.5% by weight of carbon black in the polymer composition.

In addition to the specific master batch described above, the crosslinkable polymer composition of the present invention comprise a polyethylene base polymer.

Besides polyethylene the base polymer includes up to about 5% by weight, preferably about 0.3–5% by weight, and more preferably about 0.3–4% by weight of additives. These additives include stabilising additives such as anti-oxidants to counteract decomposition due to oxidation, radiation, etc.

As mentioned earlier, the base polymer of the present invention is a chromium catalysed high density polyethylene, i.e. a chromium-containing catalyst is used at the polymerisation of the base polymer. Such cromium catalysts are previously known and therefore no detailed description is called for here. For more detailed information, reference is made to M. P. McDaniel, Advances in Catalysis, Vol. 33 (1985), pp 47–98 and M. P. McDaniel, Ind. Eng. Chem. Res., Vol. 27 (1988), pp 1559–1569. Normally, the catalyst is supported by a carrier, preferably silica. The so-called Phillips catalyst, which is based on chromium trioxide on a silica carrier, is a chromium. catalyst suitably used in the invention. The Phillips catalyst is generally produced by activating silica together with a so-called masterbatch of chromium trioxide or chromic acetate. When chromic acetate is used, it is oxidised to chromium trioxide, so that the end product is the same no matter whether use is made of chromium trioxide or chromic acetate. The chromium trioxide forms volatile chromic acid, which is evenly distributed on the silica particles. The 6-valent chromium deposited on the silica partyicles should then be reduced in order to bcome catalytically active, and this happens when the chromium comes into contact with the ethylene in the polymerisation reactor.

Another type of chromium catalyst that can be used in the invention is the so-called chromate-type catalyst. When producing such a catalyst, a chromate compound, such as silyl chromate, is deposited on an activated silica carrier, whereupon the deposited chromate is reduced by means of an alkoxide, such as an aluminium alkoxide, e.g. diethyl aluminium ethoxide.

The inventive chromium catalyst can be modified by titanation and fluoridation, which is in accordance with the prior art (see, for instance, the Preparation of Catalysts, V. G. Oncelet et al,. Elsevier Science Publishers, Amsterdam, 1991, pp 215–227, an article by C. E. Marsden).

The reason why a chromium catalysed high density polyethylene is used for the crosslinkable base polymer is that chromium catalysts give a polymer with a higher degree of unsaturation than e.g. Ziegler-Natta catalysts. Thus, while a Ziegler-Natta catalyst gives a polymer with an unsaturation of about 0.1 terminal vinyl groups per 1000 C, a chromium catalyst normally gives a polymer with an unsaturation of 0.30–0.75 terminal vinyl groups per 1000 C. This is an important advantage when the polymer is to be crosslinked.

In addition to the unsaturation normally produced at the polymerisation by the chromium catalyst it is within the scope of the present invention to create additional unsaturation by adding a polyunsaturated comonomer having 8–14 carbon atoms and at least two non-conjugated double bonds, of which at least one is terminal. As examples of such comonomers may be mentioned α,ω-alkadienes, particularly 1,7-octadiene, 1,9-decadiene and 1,13-tetradecadiene. The incorporation of 0.05–10% by weight of such polyunsaturated comonomers into the polymer corresponds to an unsaturation of 0.05–10 double bonds per 1000 C. For further details regarding the production of such unsaturated ethylene polymers reference is made to WO 94/13707.

The base polymer of the polymer composition should have a density of at least 0.940 g/cm$^3$, preferably 0.955–0.965 g/cm$^3$ a melt flow rate, MFR$_{21}$, of 1–20 g/10 min.

Other components that may be included in the crosslinkable polymer composition of the present invention are crosslinking agents such as peroxide crosslinking agents. As an example of a suitable peroxide crosslinking agent may be mentioned dicumyl peroxide. The amount of crosslinking agent generally lies in the range from about 0.1 to 2% by weight, preferably 0.5–1% by weight of the total polymer composition. In this connection it should be mentioned that the crosslinking agent is not normally included in the crosslinkable polymer composition as delivered from the polymer producer, but is incorporated by the producer of the crosslinked polymer pipe.

According to the present invention it has been discovered that by using the master batch of the invention in a crosslinkable polyethylene composition crosslinked polymer pipes can be produced that have substantially increased design stress values and that would pass the criteria for MRS 100, i.e. 10.0 MPa at 20° C. As far as known it has not hitherto been possible to produce peroxide crosslinked polyethylene pipes having a design. stress value equal to or better than MRS 100. As explained earlier, the increase in design stress value possible with the present invention makes it possible to use less material for a pipe of a given design stress value or obtain pipes with an increased design stress value with the same amount of material compared to prior art crosslinked pipes.

In order to facilitate the understanding of the invention it will now be illustrated by some non-restrictive examples.

EXAMPLE 1

A master batch according to the invention was prepared by compounding a polymer carrier of Ziegler-Natta catalysed polyethylene with a density of 0.962 g/cm$^3$ with 40% by weight of carbon black. This master batch was subsequently used to prepare a black crosslinked polyethylene pipe by compounding a chromium catalysed polyethylene base polymer with a density of 0.956 g/cm$^3$ and a MFR$_{21}$ of 6 g/10 min with the master batch in an amount such that the polymer composition contained 2.5% by weight of carbon black. In addition to the carbon black conventional additives (antioxidants) in an amount of 0.5% by weight were also incorporated. A peroxide crosslinking agent was added to the polymer composition in an amount of 0.6% by weight. Thereafter the polymer composition was made into a crosslinked pipe with an outer diameter of 32 mm and a thickness of 3 mm by extruding the composition at a temperature of about 200° C. This pipe which was in accordance with the invention was called Pipe A.

For comparison a similar pipe to the above was made, except that the master batch did not contain any carbon black. This pipe was called Pipe B.

As another comparison a pipe similar to Pipe A was made, except that the Ziegler-Natta catalysed high density polyethylene polymer carrier of the carbon black master batch was substituted for a polymer carrier of low density polyethylene, i.e. ethylene polymerised by radical initiated polymerisation at high pressure. The low density polyethylene had a density of 0.923 g/cm$^3$. This pipe was called Pipe C.

The pipes A, B and C were pressure tested at different pressures and temperatures. The results in terms of the time in hours to failure appear from. Table 1.

TABLE 1

|  | 20° C./12 MPa | 95° C./4.9 MPa | 95° C./4.8 MPa |
| --- | --- | --- | --- |
| Pipe A | 50 h | >1170 h | >1500 h |
| Pipe B |  | 34 h | 1043 h |
| Pipe C | 26 h | 3.3 h | 11 h |

From a comparison of the results in Table 1 it is evident that substituting low density polyethylene for Ziegler-Natta catalysed high density polyethylene as the polymer carrier of the carbon black master batch (pipes A and B) gives a crosslinked pipe with a substantially better pressure resistance (in terms of time to failure) at increased temperatures than a pipe made by using a conventional low density polyethylene master batch (pipe C). It is further evident that the combination of carbon black and a Ziegler-Natta catalysed high density polyethylene in the master batch (pipe A) gives a synergistic effect with superior results with regard to the time to failure at both ambient and increased temperatures.

EXAMPLE 2

Crosslinked polymer pipes were prepared in accordance with the method described in Example 1 for Pipe A. Four pipes (Pipes I to IV) with different master batches were made. All the pipes had the same base polymer as Pipe A of Example 1. Pipe I was made with a master batch comprising carbon black and a Ziegler-Natta catalysed polyethylene with a density of 0.962 g/cm$^3$; Pipe II was made with a master batch comprising a yellow pigment and a Ziegler-Natta catalysed polyethylene with a density of 0.945 g/cm$^3$; Pipe III was made with a master batch comprising a blue pigment and a Ziegler-Natta catalysed polyethylene with a density of 0.958 g/cm$^3$; and Pipe IV was made with a master batch without any pigment and a Ziegler-Natta catalysed polyethylene with a density of 0.962 g/cm$^3$. To each of the polymer compositions 0.6% by weight of a peroxide was added as a crosslinking agent and the compositions were made into crosslinked pipes in the way described in Example 1. The crosslinked pipes I to IV were then pressure tested at 95° C. and 4.8 MPa. The time to failure was determined for each pipe and the results are given in Table 2.

TABLE 2

| Pipe I | >7000 h |
| --- | --- |
| Pipe II | 50 h |
| Pipe III | 100 h |
| Pipe IV | 1000 h |

From Table 2 it is seen that while generally enhanced results are obtained by using a Ziegler-Natta catalysed high density polyethylene master batch polymer carrier, synergistically improved results are achieved by combining such a polymer carrier with carbon black.

The results obtained in Examples 1 and 2 for the crosslinked pipes A and I, respectively, would correspond to MRS 100, i.e. these pipes would be able to withstand a circumferential stress of 10.0 MPa at 20° C. for 50 years.

What is claimed is:

1. A master batch for the production of crosslinked polymer pipes which master batch comprises carbon black and a polymer carrier, characterised in that the polymer carrier is a Ziegler-Natta catalysed polyethylene with a density of at least 0.940 g/cm$^3$.

2. A master batch according to claim 1, wherein the polyethylene has a density of 0.940–0.970 g/cm$^3$.

3. A master batch according to claim 2, wherein the polyethylene has a density of 0.955–0.965 g/cm$^3$.

4. A master batch according to claim 1, wherein the master batch contains 30–60% by weight of carbon black.

5. A master batch according to claim 4, wherein the master batch contains 40–50% by weight of carbon black.

6. A crosslinkable polymer composition for the production of crosslinked polymer pipes which comprises a polyethylene base polymer compounded with a master batch which comprises carbon black and a polymer carrier, characterised in that the polyethylene base polymer is a chromium catalysed high density polyethylene, and that the polymer carrier of the master batch is a Ziegler-Natta catalysed polyethylene with a density of at least 0.940 g/cm$^3$.

7. A crosslinkable polymer composition according to claim 6, wherein the base polymer has a MFR$_{21}$ of 1–20 g/10 min.

8. A crosslinkable polymer composition according to claim 6, wherein the carbon black comprises 1–5% by weight of the composition.

9. A crosslinkable polymer composition according to claim 6, wherein the polymer carrier of the master batch has a density of 0.940–0.970 g/cm$^3$.

10. A crosslinked polyethylene pipe, characterised in that it has been made by crosslinking a pipe of the crosslinkable polymer composition according to claim 6 with a peroxide crosslinking agent.

* * * * *